United States Patent
Wiles et al.

(10) Patent No.: US 9,563,852 B1
(45) Date of Patent: Feb. 7, 2017

(54) PEST OCCURRENCE RISK ASSESSMENT AND PREDICTION IN NEIGHBORING FIELDS, CROPS AND SOILS USING CROWD-SOURCED OCCURRENCE DATA

(71) Applicant: ITERIS, INC., Santa Ana, CA (US)

(72) Inventors: Lori J. Wiles, Fort Collins, CO (US); Dustin C. Balsley, Osage, IA (US)

(73) Assignee: ITERIS, INC., Santa Ana, CA (US)

( * ) Notice: Subject to any disclaimer, the term of this patent is extended or adjusted under 35 U.S.C. 154(b) by 0 days.

(21) Appl. No.: 15/187,963

(22) Filed: Jun. 21, 2016

(51) Int. Cl.
  G06N 7/00 (2006.01)
  G06N 99/00 (2010.01)
(52) U.S. Cl.
  CPC ............ *G06N 7/005* (2013.01); *G06N 99/005* (2013.01)
(58) Field of Classification Search
  None
  See application file for complete search history.

(56) References Cited

U.S. PATENT DOCUMENTS

2016/0171407 A1* 6/2016 Jagyasi ............ G06Q 10/06311 705/7.23
2016/0247079 A1* 8/2016 Mewes .................... G06N 5/04

* cited by examiner

*Primary Examiner* — Alan Chen
(74) *Attorney, Agent, or Firm* — Lazaris IP (57) ABSTRACT

A pest and disease modeling framework for precision agriculture applies weather information, pest biological characteristics, and crop management data to anonymous crowd-sourced observations of pest presence for a reporting field. A risk assessment profile of pest occurrence for targeted fields in proximity to reporting fields is modeled to generate field-specific measures for pest management of pest infestation. The pest and disease modeling framework matches and filters weather and crop information in infested and pest-free fields based on the anonymous, crowd-sourced reporting of an existing pest presence, by evaluating similarities in pest-relevant data. Fields that are similar to infested fields have the highest risk of infestation, and the modeling framework provides output data in the form of a prediction of pest occurrence based on the risk assessment profile.

30 Claims, 2 Drawing Sheets

PEST OCCURRENCE RISK ASSESSMENT AND PREDICTION IN NEIGHBORING FIELDS, CROPS AND SOILS USING CROWD-SOURCED OCCURRENCE DATA

FIELD OF THE INVENTION

The present invention relates to assessing and predicting an occurrence of pests in crops, soils, and fields. Specifically, the present invention relates to a system and method of modeling a risk of pest occurrence based on an interaction of weather information and agricultural information for a targeted field, and known pest presence data in neighboring fields.

BACKGROUND OF THE INVENTION

Pests such as weeds, insects, and pathogens occurring in fields, crops and soils are constant problems for the agricultural industry. The presence of a pest in a field is a result of weather interacting with crop and soil management activity. Yet there are few weather-driven pest or disease models available for management decisions in relation to major crops. Also, field-specific risk assessments are only available for very few pests because the required models of pest biology are expensive to develop, despite the high value in crop output. Other issues include a lack of data for proof of concept to validate existing models or to design new models, and inherent apprehension among growers and landowners in admitting pest infestation in their fields and crops.

Some models have been developed to predict pest infestation based on weather variables. For example, development of insect or an insect population has been modeled with growing degree days to predict when the insect or a substantial portion of the insect's population will be present in a field. Disease has been predicted by comparing current or recent climatic factors such as temperature and leaf wetness over a few hours or days against measured climatic factors that are known to be favorable for a particular pathogen. These models, however, do not take into account forecasts of weather data and predictions, and also ignore other factors that interact with weather and lead to infestation. For example, crop management in particular may alter the impact of weather. Also, the crop is often susceptible at certain growth stages and crop development, like insect development, is influenced by variances in weather conditions.

Existing approaches are limited at least in part because attempting to quantify and model all these interactions is overwhelming. Even attempting to identify which are the most important factors that should be modeled is a major challenge due to the constantly-changing parameters during a growing season. Moreover, changing crop management, like different tillage methods or planting of seed varieties across different seasons, requires new studies and constant updating of models.

One existing approach to pest management is simply to compare climatic factors in un-infested and infested fields. Climatic factors in such an approach are explicitly handled as time series of data, and compared using methods to assess the similarity of time series. For example, a similarity of the pattern of average temperature over a series of days in infested versus un-infested fields would be calculated. Growing degrees days is one measure of temperature over a period, but growing degree days but does not explicitly consider such a pattern. The same value of growing degree days may be accumulated from several different patterns of weather over a set of days.

Other existing approaches to providing information regarding an agricultural pest infestation include websites that map observations of pest scouting or counts of pests from traps, along with weekly emails describing pest problems reported to extension specialists. However, constraints of cost and data privacy mean universities cannot provide information about crop management associated with specific pest-infested fields. Managers must therefore guess at the relevance of the information to their own fields, greatly reducing the reliability of such information.

Also, weather and crop information is also often imprecise on such websites, and therefore mapping only relates pest occurrence in a general way to weather. The resulting resolution of the information is poor, and pest presence is not related to specific weather variables or specific crop management activities. The manager must therefore speculate how crop management and growth stage factors in the mapped infested areas mitigate or promote pest presence, and for the number of fields in which the pest was observed. Managers must also speculate as to what weather conditions promoted the presence of the pest, and whether there are similar conditions forecast or prevailing in his or her managed fields. Managers will therefore not be able to accurately determine what crop management activities mitigate or promote pest infestation, nor will they be able to determine which of fields have a high priority for scouting or treatment.

Many techniques are available for obtaining crowd-sourced information. Often, crowd-sourced information is crucial to containing a spread of a pest or disease over a wider area because of the real-time nature of such ground truth observations. However, the effectiveness of crowd-sourcing for pest management is sharply limited by the reluctance of growers to reveal the presence of pests in their fields to others. This reluctance is harmful, as speedy knowledge of an infestation in a nearby field can help the wider region contain the spread and avoid costly damage with quick action. There is no existing approach to pest management that leverages crowd-sourced reporting anonymously, so that growers can feel comfortable with accurate reporting of pest and disease issues in their own crops and fields.

BRIEF SUMMARY OF THE INVENTION

It is therefore one objective of the present invention to provide a system and method of modeling a risk of pest occurrence in a targeted field. It is another objective of the present invention to provide a system and method of predicting pest occurrence in a targeted field. It is a further objective to assess a risk of, and predict, a pest occurrence in a targeted field based on crowd-sourced information of pest presence in neighboring or nearby fields. It is yet another objective to provide a system and method of examining an interaction of weather conditions and crop management practices to model a risk of pest occurrence in a targeted field over a specific time period, and generate a prediction of the pest occurrence in the targeted field. It is still another objective to provide an indication to growers, landowners, crop advisors, and other responsible entities of a possible pest presence in a targeted field to enable one or more responsive management actions. It is yet another objective of the present invention to provide an advisory service with recommended management actions and other alerts and notifications to such growers, landowners, crop advisors and other responsible entities where this is a risk or prediction of pest presence in a targeted field.

The present invention applies precise weather data and field-specific information about crop management to anonymous crowd-sourced observations of infested fields reporting a pest presence, and models that information for pest management in un-infested, or targeted fields. The present invention also provides a crowd-sourced pest and disease analytical tool that generates a risk assessment profile of pest occurrence and a prediction of pest occurrence for targeted fields, and generates field-specific measures for pest management of pest occurrence.

The present invention matches weather information and field information in infested and pest-free fields based on these anonymous crowd-sourced observations by evaluating similarities in pest-relevant weather data and crop management data in infested and pest-free fields. Similarities may also be evaluated in other types of information, for example in soil conditions, plant canopy temperature and moisture data, and simulated growth stage. The present invention incorporates analytical tools to continually update calculations in this evaluation of similarities to assess the risk of pest occurrence for targeted fields as pests are observed in more reporting fields.

The crowd-sourced pest and disease analytical tool and model receives a crowd-sourced report of a pest presence in a field, and accesses field-specific weather data and crop management information for each infested reporting field. The present invention also accesses pest biology data for each reported pest. Based on such knowledge, the present invention filters the weather and crop management information to identify a set of descriptors and relevant variables thereof, and select one or more predictors, from correlated variable associations of the input data impacting a pest-environment relationship for that field. The present invention then calculates the similarity of reporting and targeted fields for specific pests to profile a risk assessment for targeted fields. Fields that are similar to infested fields have the highest risk of infestation, and the present invention provides output data in the form of a prediction of pest occurrence based on the risk assessment profile.

The present invention develops an infestation suitability model that is initiated by selecting, from all available crop management and weather data about infested fields, that data which is estimated to provide appropriate correlations with pest presence. This may be thought of as an a priori selection of potential descriptors, based on knowledge of the population and spatial dynamics of the pests. The present invention then puts the selected descriptors in an unsupervised learning method engine (or, an ensemble of such methods) to look for patterns in the selected data and the relation to characteristics of targeted fields to develop one or more environmental and crop management predictors based on a multivariate similarity of variable values among the selected set of descriptors. This narrows the set of descriptors and determines their relative importance, and in some cases, the form of the relationship between the environmental variable and the likelihood of a pest problem. This resulting infestation suitability model is used to develop a risk assessment profile, which is applied to perform a calculation of the risk. The risk assessment profile may also be applied to generate a ranking of risk of targeted fields. Every time additional observations of pest presence are received, the present invention enhances its predictive capabilities by modifying the pest-environmental relationship described by the infestation suitability model, so that the model is both adaptive and dynamic.

In an alternative embodiment, observations of both a pest presence in, and a pest absence from, a reporting field may be used to model a likelihood of a pest problem. In such an embodiment, feedback from users on whether a prediction was correct (i.e., did the pest infestation occur) provides presence (or, absence data) for a post-ante analysis to refine predictor selection as to descriptors comprised of field variables and their relative importance. Such feedback may also aid in refining a definition of an agro-ecological zone, and provide information for selection of the most appropriate modeling methods.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

Figure 1:
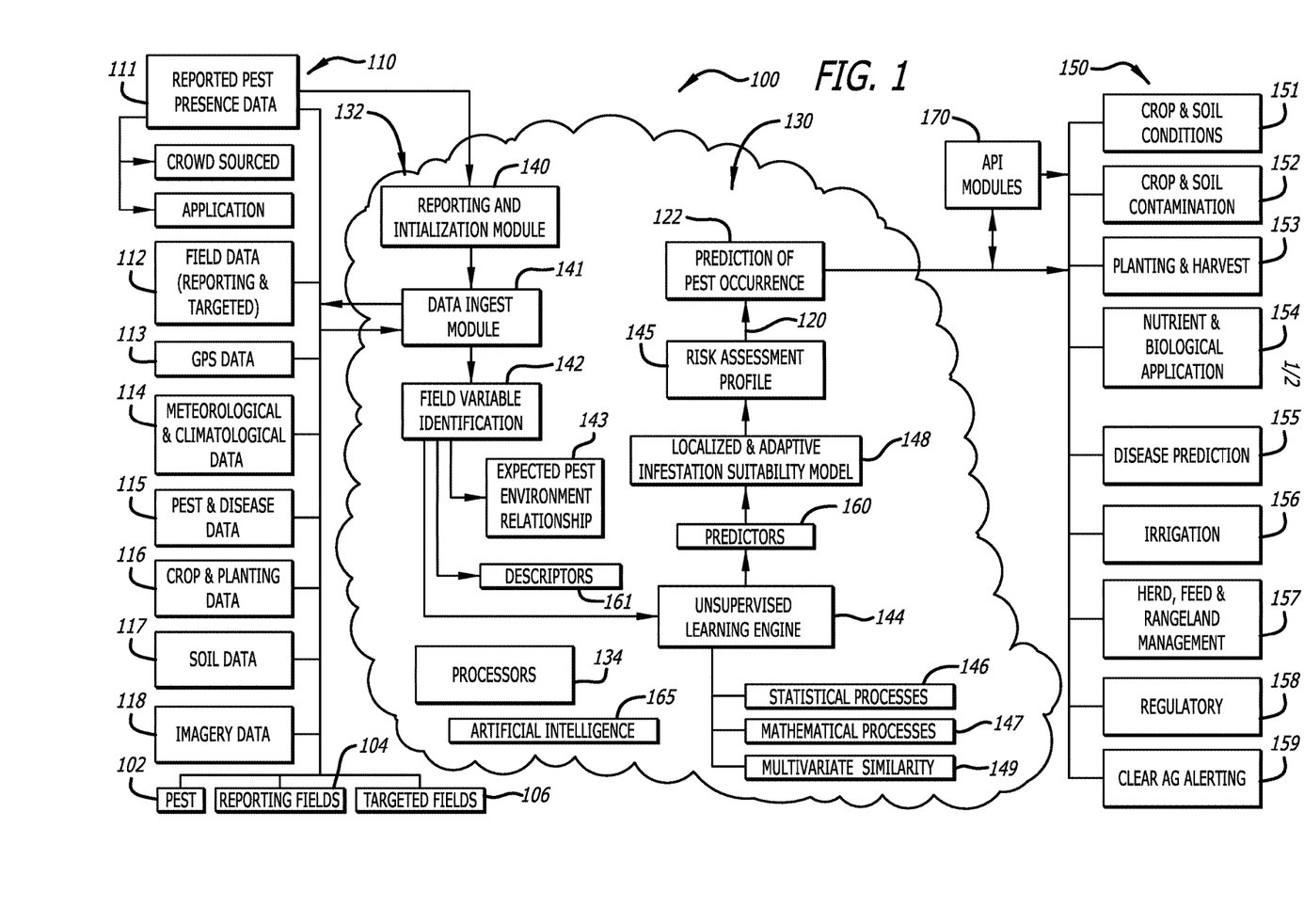
FIG. 1 is a block diagram illustrating system architecture components in a crowd-sourced pest and disease model according to one embodiment of the present invention.

FIG. 1 is a system architecture diagram for a crowd-sourced pest and disease model 100 for predicting a presence of, and profiling a risk assessment for, a pest or disease 102 in a particular, or targeted field 106, according to one embodiment of the present invention. The crowd-sourced pest and disease model 100 is performed within one or more systems and/or methods that includes several components, each of which define distinct activities required to apply real-time, field-level observations representative of a pest presence in a reporting field 104, localized weather conditions, together with long-range climatological and/or meteorological forecasting, crop management data, and pest biology data to analyze and assess a risk of infestation. This risk analysis is used to generate, in one embodiment, a prediction of pest occurrence in targeted field(s) 106 and provide diagnostic support for pest management as well as farm and harvest operations.

The risk of pest occurrence for individual fields is estimated in the present invention by the similarity of un-infested fields (or targeted fields 106) with fields that have been reported, using anonymous crowd-sourced information, as infested locally and during the current season (or reporting fields 104). For each pest 102, the present invention develops variables related to weather information, crop management actions, and other field, crop and soil characteristics that are associated with the presence of the pest 102.

Pest biology data may be used to filter these variables, and statistical measures of similarity between un-infested fields and infested fields are calculated for each variable, based on weighted vectors of predictive variables that influence pest infestation. The risk of occurrence in a field is then modeled from these measures of similarity for a targeted field 106. A profile of risk assessment is developed, which may include an estimated risk category of pest infection for each field and/or a ranking of multiple fields by risk. The crowd-sourced pest and disease model 100 therefore combines anonymous crowd-sourcing of pest presence and related information such as field-specific weather data, and models this information to create localized, dynamic measures of pest risk for individual fields. The crowd-sourced information of reported infestations is anonymous, so that users do not know which fields in their vicinity have reported a pest presence. It is to be understood that the word "field" may also include an area, rather than simply a specific field with defined boundaries. Therefore, in one aspect of the present invention (and by way of example), one or more targeted fields 106 may comprise an arbitrarily-sized area. Similarly, a reporting field may likewise comprise a reporting area.

The crowd-sourced pest and disease model 100 performs these functions by ingesting, retrieving, requesting, receiving, acquiring or otherwise obtaining input data 110 that includes reported pest presence data 111 for one or more reporting fields 104. Pest presence data 111 indicates that a specific pest 102 is present in the reporting field 104. Such data 111 is, as noted herein, provided in one or more anonymous crowd-sourced observations, and is reported electronically in a variety of different ways. For example, anonymous crowd-sourced observations may be reported using applications resident on or accessed from computing devices, or via one or social media tools. The pest presence data 111 may be reported directly by growers, land owners, crop advisors, or other responsible entities for the reporting field 104, or automatically. Pest presence data 111 may also include abundance data indicative of a pest density or severity rating when a pest is present. Regardless, it is to be understood that the present invention enables pest presence data 111 to be reported anonymously, so that recipients of output data 120 representing a prediction of pest infestation 122 for the targeted field(s) 106 are unaware of either the source of reported pest presence data 111 or the specific reporting field 104.

Crowd-sourced observations in pest presence data 111 may take many forms, and may be reported in multiple ways. For example, users may input indications or reports of a pest presence via an application or other electronic interface (or other method, as described further herein). Users may be able to type in their reports, or speak what they want to indicate, into a mobile or other computing device. Users may further be able to communicate their observations of a pest presence via text messaging, a telephone call, and any other means of communication. Such an application or interface may include one or more pull-down menus from which users can select a type of pest and other information that is used to compile a report of a pest 102 for pest presence data 111. Users may upload a previously-written report or other document, such as a spreadsheet, that contains information used to compile a report or otherwise indicate a pest 102 is present in a field 104. Users may also be able to upload a photo or a video of a pest 102, and it is to be understood that the present invention is capable of identifying the pest 102 from such a photo (or document, spreadsheet, typed or spoken language, etc.) to produce pest presence data 111. Social media feeds may also be used as crowd-sourced observations of a presence of a pest 102. Crowd-sourced observations may therefore be either manual, automated or automatic, or both. The present invention is therefore not to be limited to any one type of crowd-sourced observation, or to any one way or means of inputting reports or indications of a pest 102 in a field 104.

It should be noted that the word pest, as used herein, refers to many different types of nuisances affecting crops, plants, soils, and fields. Therefore, pests 102 may include, but not limited to, arthropods (for example, insects), nematodes, weeds, or pathogens (such as for example bacteria, fungi, and viruses). Unless otherwise indicated herein, pest 102 shall therefore refer collectively to all of these nuisance types.

Input data 110 also includes field data 112 for both reporting fields 104 and targeted fields 106. Field data 112 includes various field characteristics, such as field, soil and/or crop-related management actions taken. For example, field data 112 may include historical or recent tillage practice, such as the timing and type of tillage employed and equipment used. Treatments applied to the field may also be included in the field data 112 (such as nutrients, biologicals, or chemicals, and the timing and type of application), as well as a history of crops and seeds planted in prior growing seasons, and any prior pest or disease infestations. Field data 112 may further include water-related information such as field drainage characteristics, groundwater, watershed and aquifer data, and information on prior and recent irrigation practice. Field data 112 may further include whether a field is managed as reduced or no-tillage, other crop analytics such as the crop variety and susceptibility to a specific pest, row spacing, coverage/population, and the type of equipment used in the field, and the management practices attendant to such equipment.

Field characteristics may also include landscape information such as an identification of vegetation in areas adjacent to a planted crop, and soils information for the reporting fields 104 and targeted fields 106, as well as cropping history and pest presence in the fields and surrounding landscape in previous seasons. Field characteristics may further include information regarding land adjacent to reporting and/or targeted fields, such as for example types of trees/vegetation, water sources such as streams, and types of crops planted or growing nearby. Regardless, this may include information for both a current and past growing seasons, as well as soils information for fields between seasons, available for example from public database collections or any other source of such data.

Input data 110 may also include GPS data 113 that enables the crowd-sourced pest and disease model 100 to correlate reporting fields 104 and targeted fields 106. Such GPS data 113 enables GPS receivers to determine positional coordinates and/or boundaries of both reporting fields 104 and targeted fields 106 and their proximity to each other. This allows the crowd-sourced pest and disease model 100 to determine a geographical correlation for profiling the risk assessment 145 and prediction of pest occurrence 122 in targeted fields 106, based on the reported pest presence data 111 in reporting fields 104, as discussed further herein. Other methods of correlating fields 104 and 106 may also be utilized and are within the scope of the present invention.

In one embodiment of the present invention, all reported pest presence data 111 is provided via an application or other electronic interface (or other method, as described further herein), and a requirement to access the anonymous crowd-sourced observations comprising the reporting pest presence data 111 for modeling a pest occurrence is that the user wishing to know a possibility of pest occurrence must provide a set of information about one's field 106, such as for example crop type, seed variety, planting date, soil conditions, and tillage or other crop management characteristics, etc. The user may also be required to report any prior or existing pest infestations in other fields owned or managed. Users of the present invention, which may be packaged as a subscription-based software-as-a-service, may also be required to designate positional coordinates of their fields (the targeted fields 106). In this manner, the present invention may continually collect input data 110 for modeling within the various data processing components 132.

Input data 110 also comprises meteorological and climatological data 114, which at least includes recent and current field-level weather data and short-term weather forecast data for both reporting fields 104 and targeted fields 106, and may further include historical, predicted, and other weather information, from many different sources as noted further herein. Recent and current field-level weather data may represent in-situ or remotely-sensed observations for one or more of the reporting fields 104 and targeted fields 106, and may itself be derived from or provided directly via one or more crowd-sourced observations. The meteorological and climatological data 114 may be ingested into the present invention in raw, unprocessed form, or as processed data in the form of modeled, predicted or forecasted weather data over particular periods of time, such as short-range weather predictions and long-range, extended, and/or dynamical weather forecasts.

It is to be noted that the meteorological and climatological data 114 may include different data for both of the reporting fields 104 and the targeted fields 106. Additionally, historical weather information may include data for at least one of the previous season, the period between the previous season and the current season, and the current season. Current field-level weather data for reporting fields 104, and nearby fields, may include both historical weather and short-term weather forecasts of field-level weather for both of the targeted fields 106 and fields nearby the reporting fields 104. Furthermore, meteorological and climatological data 114 may include regional weather data that is specifically relative to pests 102 that do not winter in the reporting fields 104 and targeted fields 106, such as those pests that migrate seasonally.

Input data 110 also includes pest and disease data 115. This type of data is important for an understanding of factors influencing whether or not an infestation in a particular field will occur. Pest and disease data 115 may include pest biology and other characteristics, such as for example life cycle and development rate. Other biological characteristics may include habitat, range, reproduction rate, breeding habits, and phenotypic plasticity. Such other biological characteristics may further include other features of the pest life cycle, such as for example does the pest overwinter in the soil, does the pest blow in from the south, or come from other hosts. Regardless, these other biological characteristics may also serve to assist in selection of weather and crop management information for predictors of whether a pest occurrence will occur in the one or more targeted fields 106. Crop-related pest biological characteristics include feeding traits, plant injuries inflicted, and preferred host environments. Other biological characteristics include tolerance to temperature and moisture conditions, and resistance to chemical applicants such as insecticides or herbicides. Other factors may also play a role in influencing a pest infestation, such as the presence of predators in a particular field. All of these may also influence the development and selection of environmental and crop management predictors 160 in the initialization of an infestation suitability model 148. Biological characteristics in pest and disease data 115 may further include knowledge of spatial dynamics of the pest life cycle, and environmental constraints on pest infestation. This may further include knowledge of crop management practices or weather patterns correlated with pest infestation.

Input data 110 may further include crop and planting data 116, such as crop type, seed type, planting data, growing season data and projections, projected harvest date, crop canopy and soil conditions over time, relative maturity, planting or emergence date, crop temperature, crop moisture, seed moisture, plant depth, row width, and any other crop and plant information that may be used to profile the risk assessment 145, and the pest occurrence predictions 122 forming the output data 120. Crop and planting data 116 may further comprise crop management information that incorporates all of the above types of data. Regardless, crop and planting data 116 may be provided as output data from one or more of phenology models of crop and plant growth, and other methods of predicting crop and plant growth over the course of a growing season, such as continual crop development profiling of the like disclosed in U.S. Pat. No. 9,131,644. Similarly, harvest data may be provided as output data from one or more models of harvestability, such as those disclosed in U.S. Pat. No. 9,076,118. Crop and planting data 116 may also provide further information about crop management actions for the reporting fields 104 and targeted fields 106.

Additional input data 110 may include soil data 117, such as for example the soil type, soil temperature, soil moisture content, soil porosity, soil pH, soil profile, and mineral content, such as for example its sodicity. Soil data 117 may include a temporal component, so as to represent conditions in a current growing season, or for a period of time extending until a following growing season, or for a prior growing season(s). Soil data 117 may be imported from one or more external database collections, such as for example the USDA NRCS Soil Survey Geographic (SSURGO) dataset containing background soil information as collected by the National Cooperative Soil Survey, or from one or more models configured to profile soil structure and composition. Soil data 117 may also be provided from growers or landowners themselves (or other responsible entities), from soil advisory tools, from farm equipment operating in a field, and any other source of such information.

Crop and planting data 116, biological characteristics for a pest 102, and other input data 110 may further define a specific time period for the prediction 122 of pest occurrence in a targeted field 106. For example, the present invention may generate a prediction 122 that a pest occurrence will materialize within x number of days, as a result of the growth stage of a crop in the targeted field 106, the known life cycle of the pest 102, and known crop management activity. The present invention may therefore apply the risk assessment profile 145 to identify a specific time period for an infestation, in addition to a prediction 122 that an infestation will occur.

Input data 110 may also include many other types of data that can be used by the crowd-sourced pest and disease model 100 to profile the risk assessment 145 and generate the pest occurrence prediction 122 in targeted fields 106. Such other data may include imagery data 118, such as remotely-sensed satellite imagery data and remotely-captured drone imagery data from orbiting satellites or remotely powered vehicles. When processed, such imagery data 118 may provide details at a field-level resolution, which can be used by the crowd-sourced pest and disease model 100 to improve both the risk assessment profile 145 and pest occurrence prediction 122 in the present invention.

The input data 110 may further include background data for the steps involved in identifying descriptors 161 and selecting predictors 160 from multivariate similarly 149 of variables thereof for unsupervised learning, as discussed further herein. Such background data may be acquired from users registering and reporting on all fields that they have. This background data is also anonymous and based on crowd-sourcing. The present invention uses the information on reported fields without the pest, but with reasonable conditions to assume that the pest might be present, as the background data. Reasonable conditions are defined based on what is known about the pest. For example, the present invention may be configured to not use a field as background information if the crop has not reached the susceptible growth stage, or if the model, using weather and the planting date, predicts the crop is not at the susceptible growth stage.

The positional coordinates of reporting fields 104 and targeted fields 106 may identify a specific agro-ecological zone for a localized modeling of infestation suitability. While it is to be expected that weather patterns and crop management are similar within a common agro-ecological zone, it should be noted that an agro-ecological zone may be defined by either or both environment and management practices, rather than merely using distance alone. Therefore, GPS coordinates may serve as predictors 160 in the infestation suitability model 148 depending, for example, upon how such as agro-ecological zone is defined.

Regardless of the type input data 110, information ingested into the present invention may include, in addition to anonymous crowd-sourced observations, one or more of image-based data, vehicular data, sensor data, and information from other third party systems. Image-based data may be derived from systems such as video cameras, and vehicular data may be generated from one or more vehicle-based sensing systems, including those coupled to computing systems configured on farm equipment, or those systems configured to gather weather data from mobile devices present within vehicles, such as with mobile telephony devices and tablet computers. Sensor data may be provided from one or more sensors in or near a field, such as sensors configured on farm equipment or positioned throughout a field. Crowd-sourced observations, as noted above, may be provided from multiple sources, such as for example growers, farmers, land owners, equipment operators, crop advisors or consultants, and any other responsible entities, and such data may be provided via oral or written reports, or electronically using mobile telephony devices or tablet computers, or any other computing devices that incorporate software tools such as mobile applications for accessing and using social media feeds. Regardless of the method of collection or source, however, it is to be understood that anonymity is maintained for reporting users by never showing where the pest was observed to users wishing to know a risk or prediction of infestation for targeted fields 106.

The input data 110 is applied to a plurality of data processing modules 132 within a computing environment 130 that also includes one or more processors 134 and a plurality of software and hardware components. The one or more processors 134 and plurality of software and hardware components are configured to execute program instructions or routines to perform the functions of the crowd-sourced pest and disease model 100 described herein, and embodied by the plurality of data processing modules 132.

The plurality of data processing modules 132 in computing environment 130 include a reporting component 140 which processes incoming pest presence data 111 and determines whether to proceed with performing the steps of the crowd-sourced pest and disease model 100. This may be accomplished by analyzing the positional coordinates of reporting fields 104 and targeted fields 106, for example where reporting data 111 in the crowd-sourced observations includes GPS-tagged occurrence data. GPS data 113 may also be requested by the present invention, for example via data ingest component 141.

The plurality of data processing components 132 may therefore also include such a data ingest component 141, which is configured to perform ingest, retrieval, request, reception, acquisition or obtaining of input data 110. The plurality of data processing modules 132 may also include a pest-environment identification component 142, which processes the input data 110 to identify one or more predictive field variables for the set of descriptors 161, of an expected pest-environment relationship 143. This is performed by examining associations between the types of input data 110 to identify factors explaining the conditions leading to the pest occurrence in the reporting field 104. When crowd-sourced information that includes pest presence data 111 is received into the present invention, the crowd-sourced pest and disease model 100 may pre-select variables for these descriptors 161 based on known characteristics of the pest 102 or the reporting field 104.

The data ingest component 141 may be configured to perform a number of different functions. For example, the data ingest component 141 may be configured to convert raw information from reporting fields 104 and targeted fields 106 into descriptors 161 and the predictors 160 for the infestation suitability model 148, and initialize algorithms for building the infestation suitability model 148. It may also be configured to monitor incoming reports of pest presence, and appropriately trigger rebuilding of descriptors 161 and predictors 160 for the infestation suitability model 148 and generation of a risk assessment profile 145. The data ingest component 141 may also monitor incoming requests to generate risk assessment profiles for the one or more targeted fields 106.

The present invention provides, in one embodiment thereof, a generalized approach to pest and disease modeling in precision agriculture, in which prediction of a likelihood of infestation is determined from similarities between a targeted field 106 and infested, reporting fields 104 based on weather, crop, field and landscape characteristics correlated with a presence or abundance of the pest in those infested fields 104.

This generalized approach includes several steps in evaluating the likelihood of infestation. One such step is to identify the relative correlation of pest infestation from variables relative to weather, field, soil, crop, landscape, and other characteristics of infested fields 104. It is contemplated that such variables may be pre-selected based on known characteristics of the pest 102 or the reporting field 104, such as those previously learned or identified associations among the input data 110. Regardless, correlated associations of these variables among the input data 110 are used to identify a set of descriptors 161 to develop an observed/expected pest-environment relationship in the infested fields 104. Another step is to characterize the observed relationship between pest infestation and the correlated variable associations. The observed relationship may represent, for example, an average value of a variable, or identifying a representative response.

A further step assesses the similarity of variables of a targeted field 106 to infested fields 104 based on the relative correlation of variable associations and observed relationship. This is an assessment of multivariate similarity 149 of variable values, and may apply many different statistical measures of similarity, such as distance or correlation. The appropriate measure depends on the type of variable (i.e. continuous, categorical or binary).

The present invention applies unsupervised machine learning in implementing each of these steps, and in many of these approaches, these steps are not distinct. Regardless, some form of unsupervised machine learning is applied to the descriptors 161 representing variables of the infested fields 104, and the assessment of multivariate similarity 149 of variables of a targeted field 106 to those of the infested fields 104. One way similarity may be measured is by comparing the relevant variables of targeted fields 106 to a summary of the response for the infested fields 104. Another exemplary approach compares the value for the targeted field 106 to all values for infested fields 104 with an algorithm based on self-organized maps. A further example of accomplishing these steps involves feature selection and weighting, by characterizing the relationship of a relevant characteristic with an average value and measuring the similarity of a targeted field 106 and the average value for infested fields 104 for each individual characteristic. An aggregate similarity measure is calculated using the vector of weights from feature selection and similarity values of individual characteristics.

Still another example of unsupervised machine learning to perform these steps uses clustering. Suitable clustering methods include knn clustering, spectral clustering or neural network clustering. The prediction of risk of pest infestation is based on which the number of infested fields 104 in each cluster and the cluster membership of a targeted field 106 when it is evaluated by the clustering method used with the infested fields.

The crowd-sourced pest and disease model 100 therefore also includes a unsupervised learning engine 144, which is configured to create a risk assessment profile 145 by comparing characteristics of reporting fields 104 and targeted fields 106 in environment and crop management predictors 160 selected from descriptors 161 of field variables identified in the pest-environment relationship 143. The risk assessment profile 145 can be generated using many different methods, as noted in detail below. Regardless of the specific method, the unsupervised learning engine 144 may apply one or more of statistical analyses 146 and other mathematical processes 147 to create an infestation suitability model 148 from the pest presence data 111. The infestation suitability model 148 may be considered as application of artificial intelligence, for example in one or more models 165 that automatically and continually identify additional descriptors 161 and select additional environmental and crop management predictors 160, as well as any coefficients for those predictors 160 related to the multivariate similarity analysis 149, for the pest-environment relationship 143 as additional crowd-sourced information is received.

One such method involves assigning weighted vectors of the field variables, where weights denote the importance of each variable identified in the pest-environment relationship. The unsupervised learning engine 144 models these weighted vectors of field variables by performing statistical analyses 146 and other mathematical processes 147 to estimate a probability that targeted fields 106 will be infested. The unsupervised learning engine 144 generates a risk assessment profile 145 based on this estimate. The profile 145 is applied to generate the pest occurrence prediction 122 as output data 120.

The unsupervised learning engine 144 is configured to generate dynamic and adaptive risk assessments as a growing season progresses that are localized to the observation of a pest presence 102 in reported fields 104, as applied to predictions of a pest presence in nearby targeted fields 106. As additional crowd-sourced observations containing pest presence data 111 are ingested for fields 104, the unsupervised learning engine 144 refines its risk assessment profile 145 by continually modeling the weighted vectors of field variables that aid in identifying predictors 160 from descriptors 161. Accordingly, the statistical processes 146 and other mathematical processes 147 may update the risk assessment profile 145 by continually and automatically determining the importance of each predictor 160 from the set of descriptors 161 identified in the expected pest-environment relationship for modeling the field-specific risk of pest occurrence in the one or more targeted fields 106.

The data processing components 140 may therefore also be thought of as performing a customized modeling approach for assessing a field-specific risk, and for predicting a pest infestation or presence in a field 106, for a particular time period. The model 100 estimates the probability that targeted fields 106 will become infested by calculating a similarity of each un-infested, targeted field 106 to a reporting, or infested, field 104. As noted above, these calculations can be accomplished in several different ways, and using several different methods (or, an ensemble of different methods).

The unsupervised learning engine 144 is configured to construct a localized and adaptive infestation suitability model 148 based on the environmental and crop management predictors 160 to map and determine a risk of pest occurrence in the one or more targeted fields 106. This infestation suitability model 148 is based on pest presence data 111 in the reporting fields 104, and may utilize one or more different methods of mapping infestation suitability from this pest presence data 111. One such method involves calculating some measure of similarity in the one or more targeted fields 106 to the infested, reporting fields 104, based on environmental and crop management predictors 160 that describe past crop/field management and environmental conditions reported or experience in the reporting fields 104.

There are several different approaches that may be utilized for this method of calculating measures of similarity. One such approach may involve assigning coefficients of multivariate similarity 149 to the environmental and crop management predictors 160 for the location where the pest 102 has been observed by assigning importance to predictors 160 that particularly influenced the pest infestation reported in the pest presence data 111. One way to develop these coefficients is to examine a relative likelihood of a pest presence in the one or more targeted field 106 based on a comparison of characteristics of a targeted field 106 to the characteristics to the group of known infested, reporting fields 104, with knowledge of the particular pest 102 and other factors such as weather and pest biology. Another way to develop these coefficients is to assign weights to vectors that influence environmental and crop management predictors 160. Another approach to calculating measures of similarity may involve developing profile methods that are based on ranges of descriptive environmental and crop management predictors 160 for the location where the pest 102 has been observed.

Another method for mapping and determining infestation suitability from pest presence data 111 involves modeling pest presence versus availability of habitat, and involves characterizing available habitat by a sample of other locations (or, alternatively, from a more complete census). This method may employ many different statistical processes 146 that apply to analysis of a binary classification (i.e. presence or absence). Samples of locations having a reported pest presence provide the most suitable data for developing an infestation suitability model 148. Nonetheless, the present invention contemplates that fields without reports of a pest presence may be used in a reasonable sampling of other locations, particularly where an agriculture retailer or crop consultant working on a large number of fields in an area needs information on all interested fields.

Still another method for mapping and determining infestation suitability from pest presence data 111 is an "infestation suitability" model 148 based on expert opinion to assign weights to, and define, transfer mapping functions of environmental and crop management characteristics of fields. Transfer mapping functions describe the relationship between the likelihood of infestation and the value of an environmental or crop management predictor 160 (i.e. more rain, then more likely). Expert opinion may be combined with crowd-sourced information for a more accurate representation of conditions leading to the pest presence. Regardless, data collected from the infested, reported fields 104 may be used to modify a priori transfer mapping functions.

An ensemble approach that combines one or more of the methods described herein may also be used to increase accuracy from the prediction of pest occurrence 122 generated from the risk assessment profile 145. Regardless, the present invention may also develop one or more additional artificial intelligence models 165 that are configured to automatically and continually analyze the input data 110 to ascertain the environmental and crop management predictors 160 from the set of descriptors 161 for the unsupervised learning engine 144, as well as to ascertain which pest biological characteristics will assist in constructing selected predictors 160 that serve to initialize the infestation suitability model 148 in the unsupervised learning engine 144.

The present invention also contemplates that the unsupervised learning engine 144 may include applying one or more methods to measure the similarity of time series of one or more weather variables for developing the infestation suitability model 148. Such methods involve calculating the similarity of time series of weather data, which may be constructed for each field based on calendar date or crop date (for example, a number of days since planting, or days since a certain crop growth stage). Such a calculation of the similarity of time series of weather day may also serve as one or more of the environmental and crop management predictors 160, in addition to a separate step in the overall unsupervised learning engine 144.

In a further method, the unsupervised learning engine 144 may calculate a similarity from a percentage of fields that have the same value as the targeted field 106 according to variables from one or more weighted vector categories. The unsupervised learning engine 144 may also calculate a probability density function for each variable and assign a similarity based on where the value of the variable falls within the probability density function. In another example, the model 100 may calculate a single measure of similarity for each field as weighted calculation from the similarity measures of individual factors. The vector weights would indicate the significance of the individual factor in promoting pest presence. The model 100 may also assign pre-defined risk category to the similarity measure for each field 106, or rank the fields 106 by their similarity to the infested field 104.

Other methods of analyzing input data may also be employed by the crowd-sourced pest and disease model 100. In another example, a Bayesian approach may be applied to update pre-existing models developed by the artificial intelligence modeling portion 165 of the present invention, as more fields 104 are reported as infested. The present invention may also examine similarities in patterns of important weather variables leading up to pest presence to an additional layer of accuracy to the model 100. This incorporates methods of calculating the similarity of time series data, and adds a further dimension by enabling a look-back at conditions present in the reporting field 104 that impacted development of the pest 102. Such a time-series look-back measures similarities in time-series data sets, and enables pattern-matching of attributes such as weather over time in the targeted field 106 to the pattern in fields where the pest 102 has been observed.

One exemplary application of a time-series look-back in the present invention is as follows. Stewart's disease is a bacterial disease affecting corn crops that is spread by corn flea beetle. Warm winter air temperatures in December, January, and February may increase the survival of corn flea beetle and result in greater transmission of the bacterium in the following growing season. The present invention would not need a model of winter survival of corn flea beetle; instead the model looks for fields that had similar winter weather, along with recent conditions conducive for disease infection, to develop a prediction of pest occurrence in the coming growing season.

In addition to the approaches described above, the present invention may further incorporate one or more existing modeling approaches (or, an ensemble of such approaches) that may be suitable for identifying the set of descriptors 161, and selecting environmental and crop management predictors 160, that are used to construct the localized and adaptive infestation suitability model 148 for determining a risk of pest occurrence in the one or more targeted fields 106. Such approaches include an envelope method, such as BIOCLIM, and distance-based methods such as DOMAIN and LIVES that assess possible infestation sites in terms of environmental similarity to areas with a known pest presence. Other models may also be utilized, particularly where additional information such as absence data is incorporated, for example regression-type models may also be applied, such as multivariate adaptive regression splines (MARS), regression trees, generalized additive models (GAMs), generalized dissimilarity models, and generalized linear models. Other machine learning models may also be suitable, such as maximum entropy models (MAXENT and MAXENT-T) and boosted decision/regression trees or stochastic gradient boosting.

Regardless of the method or approach employed to arrive at selected predictors 160, the model 100 analyzes the set of descriptors defining a similarity comparison between the reporting field 104 and the targeted fields 106 from the expected pest-environment relationship to create the risk assessment profile 145 for the targeted field 106 from selected environmental and crop management predictors 160. Risk may be assessed in a number of different ways using the risk assessment profile 145. For example, a field 106 may be rated as low risk due to forecasted weather that is not similar in ways conducive to pest presence. A low risk may attributed where a resistant crop or seed variety was planted in the field 106. A low risk may also be assigned where the crop is not predicted by a crop growth model to be at a susceptible growth stage that matches with plant biology, as a further example of how pest biology data may be thought of as a filter for matched interactions between weather and crop management data. Conversely, a field may be rated at high risk where the pest is very mobile, and a known infested field is in close nearby proximity. Risk may further be assessed as a numerical value, or in one or more indicators specifically tailored to particular fields, crops, growers, or users. The present invention may apply the risk assessment profile 145 to identify suitable windows of opportunity for performing certain cultivation tasks, or applying treatments, to avoid or mitigate damage from infestation. Alternatively, users of the model 100 may also receive, as an output indicator, a measure of likelihood or risk of a particular pest for the targeted field 106. The model 100 may also generate an indication or reason of why the targeted field 106 is at high risk (such as planting date, weather, pest life cycle, seed variety, etc.) It is therefore to be understood that many different methods and approaches of applying the risk profile to assess risk may be utilized and are within the scope of the present invention.

Certain types of the input data 110, for example biological characteristics of a pest 102 in pest and disease data 115, may be used to filter the weather and crop management information to determine and select relevant environmental and crop management predictors 160 impacting a pest-environment relationship 143 for that field 102, or to inform or assign weights to vectors of the field variables when such a method is used. One exemplary situation is where a pest problem in a field is the result of the intersection of the crop at a vulnerable growth stage and the pest reaching the damaging growth stage. However, the optimal weather, management and field conditions that result in crop reaching a vulnerable growth stage (a particular variety, planting date and weather conditions interacting with the soil type) are not the same as the optimal conditions for the pest to reach the damaging growth stage (presence of a particular type and amount to crop residue for overwintering of the pest). For example, a large presence of crop residue may translate to a higher population of the overwintering stage of a pest, but the amount of crop residue can influence warming of soil in the spring and consequently the speed of emergence of the crop. There may be further complications if the pest has natural enemies and development and abundance of the natural enemy is driven by different weather conditions than crop growth or emergence of the overwintering pest from the soil. The modeling paradigms of the present invention aid uses in such situations, because the severity of damage from a pest and consequently the need for control may be influenced in complex ways by weather that are best captured by similarity analyses, rather than sorting out causal factors. In one specific example, in common smut infestations of corn, moisture is needed for fungal spores to germinate and penetrate the host, so the infested field will have recent rainfall or high relative humidity. However, the spores of smut fungus are able to only infect tissue that has been damaged. Appropriate damage may be caused by blowing soil particles or hail. If a crowd-sourced observation of corn smut is associated with hail or high winds in the field, this would be reflected in weather data for the current growing season. Fields with matching weather would be predicted to likely be at risk of corn smut infestation.

It is to be understood further that many other types of output data 120 are possible. The risk assessment profile 145, as noted above, may be used to generate specific predictions 122 of pest infestation in targeted fields 106, and one or both of these may be further used to suggest, recommend, or generate one or more management actions, either before or after infestation, to address a pest infestation and/or mitigate the impact. Additionally, many different users and uses of this output data 120 are possible. Output data 120 may therefore be used to perform several functions, either directly or through other systems, hardware, software, devices, services (such as the advisory services 150 described below), and application programming interfaces 170.

Examples of management actions include notifications to begin scouting targeted fields 106 to confirm presence of a pest 102, and/or to confirm that the density or extent warrants a control action. Scouting may also be advised to confirm presence of a pest 102, and/or for observation and planning for the next growing season in targeted fields 106. Other actions include notices to set out traps (for example, for insects), to control the infestation, such as through a pesticide application, or other practice such as tillage, or apply other preventative treatment, for example where the pest 102 is a pathogen. Crop-specific actions may include delayed planting and use of a resistant seed variety to mitigate any impact from the pest 102. Notifications may also be provided directly to farm equipment operating in a targeted field 106. For example, a notification may be provided directly to tillage equipment to adjust or stop tilling of a targeted field 106, or to irrigation equipment operating in a targeted field 106 to adjust a timing or type of artificial precipitation used, or a direction of application.

The crowd-sourced pest and disease model 100 may also enable one or more specific application programming interface (API) modules 170 to provide all of the modular services described above and generate specific outcomes, such as one or more specific advisory services 150. Alternatively, these services 150 may be provided directly by the present invention. Regardless, such a service 150 or API 170 may be tailored to provide specific management actions.

For example, the present invention may provide a crop and soil conditions advisory 151 regarding targeted fields 106 that include information beyond the notifications described above. Such an advisory service 151 may model possible crop and soil damage from infestation of a pest 102 and provide analytics of such damage, such as for example an economic impact on a crop in the current growing season, or an impact on soils from treatments applied to crops to control the pest 102.

The present invention may also provide a contamination advisory service 152 for crops, soils, and groundwater or aquifers that is provided to owners of fields, growers of crops, and other responsible entities in relation to targeted fields 106. Such a service may advise on tillage practices, for example where the pest 102 is a pathogen such as an avian influenza virus that is able to survive very cold soil temperatures. Soils in targeted fields 106 that are proximate to fields, reporting or otherwise, along migratory bird routes may become infected from bird droppings carry such a pest 102. Tillage of contaminated fields may create airborne particles that are easily spread to other fields. Such an advisory 152 may model the use of certain field equipment, and/or tillage timing and conduct, and may be dependent on a variety of factors. Such an advisory 152 may therefore provide tillage practice analytics to manage pest containment in targeted fields 106.

Many additional agricultural advisories 150 are contemplated. Examples of advisory services 150 that include other agricultural management services are a planting and harvest advisory service 153, and a crop and soil nutrient and biological application advisory service 154, a disease prediction advisory service 155, an irrigation advisory service 156, and a herd, feed, and rangeland management advisory service 157. Additional management services may include a regulatory advisory service 158.

ClearAg and other alerting is still another service 159 contemplated by the present invention. ClearAg is an application offering a suite of precision agriculture services, includes alerts that provide subscribers and other users with actionable information regarding harvest, planting, irrigation, pest/disease, nutrient, and other issues attendant to crop, field, and soil management.

All of these advisories 150 are possible with the output data 140, based on the input data 110 ingested. For example, a regulatory advisory service 158 may produce an advisory based on the risk assessment profile 145 where a recommended management action is application of a particular chemical or treatment to eradicate a pest 102. Such an advisory 158 may indicate that a soil will have a high contamination risk of a substance that requires federal or state reporting after application. Another example of a regulatory advisory service 158 is an indicator of predicted environmental impact from runoff following delivery of a chemical treatment to soils, where irrigation patterns are a known component of crop management data.

In a further example, an irrigation advisory service 156 may consider predictions of pest occurrence 122 to inform growers, landowners, or other responsible parties of irrigation-related pest mitigation actions, such as the positioning of flood, drip, and spray irrigation equipment, the timing of their use, and amounts of artificial precipitation to be applied. In still a further example, the herd, feed, and rangeland management advisory service 157 may provide information for reducing a stocking rate or purchase of additional feed for existing stock for rangeland management to mitigate a threat of pest infestation.

It is to be noted that advisory services 150 may be provided as a specific outcome of the present invention where it is configured to provide all of the modular services described above in a packaged format, and the advisory services 150 may also be processed from output data 140 (either directly, or via the API modules 170). It is further to be understood that many such advisory services 150 and API modules 170 are possible and are within the scope of the present invention.

As noted above, in one or more additional or alternative embodiments of the present invention, the present invention may be thought of as an artificial intelligence approach 165 that may be applied to develop relationships between the various types of input data 110 to select variables and identify a set of descriptors 161, to generate the expected pest-environment relationship 143. The unsupervised learning engine 144 is configured to automatically and continually explore relationships between the input data 110 to select the environmental and crop management predictors 160 based on the evaluation of multivariate similarity 149 between variable values as pest presence data 111 in crowd-sourced information is received. As more and more input data 110 is accumulated, information can be sub-sampled, and the crowd-sourced pest and disease model 100 retrained, to develop a more reliable understanding of infestation suitability in the model 148. Such modeling may also implicitly yield information as to the importance of environmental and crop management predictors 160, and any multivariate coefficients assigned to them. This may be used to select which predictors 160 are particularly important or unimportant in the associated process, and thus help to target ways of improving the crowd-sourced pest and disease model 100 over time.

Figure 2:
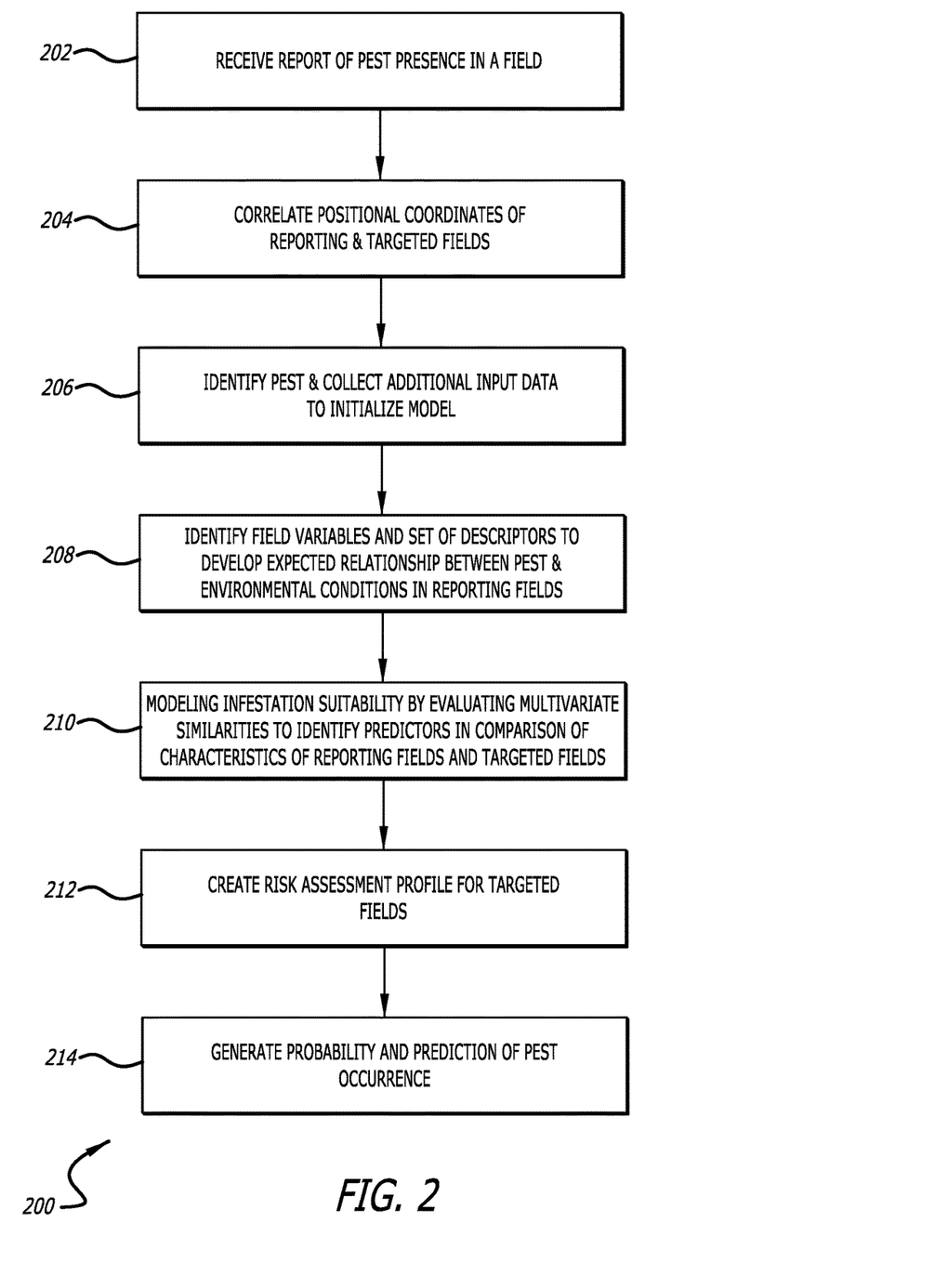
FIG. 2 is a flowchart of steps in a process of performing a crowd-sourced pest and disease model according to another embodiment of the present invention.

FIG. 2 is a flowchart of steps in a process 200 of performing a crowd-sourced pest model according to another embodiment of the present invention. In FIG. 2, the process 200 receives pest presence data 111 in anonymous crowd-sourced observations for a reporting field 104 at step 202, and proceeds by correlating positional coordinates of both reporting fields 104 and targeted fields 106 at step 204. If there is no correlation between reporting fields and targeted fields 106, the process 200 terminates; if there is correlation, the process 200 proceeds with step 206 to identify the pest 102, and collect additional the input data 110 needed for modeling the risk assessment profile 145 the crowd-sourced pest and disease model 100. The process 200 may also include receiving a request to generate a risk assessment profile 145 for a targeted field 106.

The process 200 then proceeds with identifying field variables to develop the expected relationship between pest and environmental conditions in reporting fields 104 at step 208, as described in detail above. The model 100 then begins, at step 210, with analyzing field variables to compare characteristics of reporting fields 104 and targeted fields 106 in the unsupervised learning engine 144. At step 212, the unsupervised learning engine 144 creates a risk assessment profile 145 for the targeted field(s) 106. The process 200 then generates one or both of a probability and prediction of pest occurrence 122 at step 214. The process 200 may repeat continuously, as additional presence data 111 is analyzed and ingested in anonymous crowd-sourced observations, so as to automatically and continually refine the output data 120.

Meteorological and climatological data 114 may be collected from many different sources of weather information to provide one or more of the recent and current field-level weather data and short-term weather forecast data, for example as data that is complementary to the data assimilation systems and forecasting systems noted below. As noted above, weather information may be ingested into the present invention in either raw or processed form, from many different sources. Such sources of weather information may include data from both in-situ and remotely-sensed observation platforms. For example, numerical weather prediction models (NWP) and/or surface networks may be combined with data from weather radars and satellites to reconstruct the current and near-term forecasted weather conditions on any particular area to be analyzed. There are numerous industry NWP models available, and any such models may be used as sources of meteorological data in the present invention. Examples of NWP models at least include RUC (Rapid Update Cycle), WRF (Weather Research and Forecasting Model), GFS (Global Forecast System) (as noted above), and GEM (Global Environmental Model). Meteorological data is received in real-time, and may come from several different NWP sources, such as from the European Centre for Medium-Range Weather Forecasting (ECMWF), Meteorological Services of Canada's (MSC) Canadian Meteorological Centre (CMC), as well as the National Oceanic and Atmospheric Administration's (NOAA) Environmental Modeling Center (EMC), and many others. Additionally, internally or privately-generated "mesoscale" NWP models developed from data collected from real-time feeds to global and localized observation resources may also be utilized. Such mesoscale numerical weather prediction models may be specialized in forecasting weather with more local detail than the models operated at government centers, and therefore contain smaller-scale data collections than other NWP models used. These mesoscale models are very useful in characterizing how weather conditions may vary over small distances and over small increments of time. The present invention may be configured to ingest data from all types of NWP models, regardless of whether publicly, privately, or internally provided or developed.

In one embodiment of the present invention, the model 100 is applicable within an organizational crowdsourcing environment. An organization may be, for example, an agriculture retailer, crop consultant, or large agribusiness enterprise, and therefore the crowd-sourced observations of presence data 111 may include intra-organizational information about soils, crop, planting date and management that have been previously collected across the multiple fields of the entire organization. An example of an intra-organizational use in such an embodiment includes multiple fields in proximity to each other that are owned, operated or maintained by a common enterprise, and on which different seeds, crops, and tillage practices are being applied. The one or more targeted fields 106 may therefore comprise an entire area of arbitrary size, and it is to be understood that targeted fields 106 may be not contiguous, regardless of the embodiment. Regardless, the approach used in the present invention to perform the infestation suitability model 148, such as the environmental and crop management predictors 160, may rank multiple fields of a single customer according to likelihood of pest occurrence. Such a ranking may assist users to prioritize which fields to manage or visit among a set of fields.

The systems and methods of the present invention may be implemented in many different computing environments 130. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a mobile device or personal computer through such mediums as an applet, JAVA® or CGI script, as a resource residing on one or more servers or computer workstations, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:
receiving crowd-sourced information indicating a pest presence in a reporting field and identifying a pest, in at least one GPS-tagged report from which a GPS receiver extracts positional coordinates of the reporting field for correlation of the positional coordinates of the reporting field with coordinates of one or more targeted fields;
obtaining one or more of pest data that at least includes biological characteristics of the pest, weather information that at least includes one or more of recent and current field-level weather data and short-term weather forecast data for the reporting field and for the one or more targeted fields, and crop management data that includes at least one of crop planting dates and crop growth information over time for both reporting field and the one or more targeted fields, wherein the crowd-sourced information, the pest data, the weather information, and the crop management data collectively comprise input data;
analyzing the input data in a plurality of data processing modules within a computing environment in which the plurality of data processing modules are executed in conjunction with at least one specifically-configured processor, the data processing modules configured to model a field-specific risk of pest occurrence in the one or more targeted fields, by
identifying a set of descriptors relating to the pest presence in the reporting field from one or more correlated variable associations of the input data to develop an expected pest-environment relationship in the reporting field, and
constructing an adaptive and localized infestation suitability model for the one or more targeted fields from the set of descriptors to perform a comparison between the reporting field and the one or more targeted fields from the expected pest-environment relationship in a unsupervised learning engine, by 1) selecting one or more environmental and crop management predictors from the set of the descriptors based on a multivariate similarity among the correlated variable associations of the input data, 2) calculating statistical probabilities of similarity of pest occurrence relative to the selected one or more environmental and crop management predictors, and 3) continually updating the modeling of the field-specific risk of pest occurrence in the one or more targeted fields by identifying the set of descriptors for the pest-environment relationship, selecting one or more of the environmental and crop management predictors based on the multivariate similarity among the correlated variable associations of the input data, and the statistical probabilities of similarity of pest occurrence as the crowd-sourced information is received, to create a risk assessment profile for pest occurrence for the one or more targeted fields; and
generating, as output data, a pest occurrence prediction from the risk assessment profile.

2. The method of claim 1, wherein the pest occurrence prediction is generated for a specified period of time in a current growing season.

3. The method of claim 2, wherein the specified time period is determined by the biological characteristics of the pest.

4. The method of claim 1, wherein the pest is an arthropod, a nematode, a pathogen, or a weed.

5. The method of claim 1, further comprising obtaining soil data for the reporting field and the one or more targeted fields, the soil data including one or more of a soil type, pattern of soil temperature, and pattern of soil moisture content, for at least one of a current growing season and a period of time extending up to and including a current growing season.

6. The method of claim 1, wherein the crop management data further includes plant canopy conditions over time, crop type information, relative crop maturity, planting date, irrigation application data, and tillage information.

7. The method of claim 1, further comprising applying the risk assessment profile to a decision support tool configured to provide one or more advisories of the risk assessment to a user.

8. The method of claim 1, wherein the one or more advisories include at least one of an agricultural advisory, a disease advisory, and a regulatory advisory.

9. The method of claim 1, further comprising updating the pest occurrence prediction in the one or more targeted fields as additional crowd-sourced information for additional reporting fields in a vicinity of a targeted field is received for constructing the adaptive and localized infestation suitability model.

10. The method of claim 1, wherein the biological characteristics of the pest at least include life cycle and development rate of the pest.

11. A system comprising:
a computing environment including at least one computer-readable storage medium having program instructions stored therein and a computer processor operable to execute the program instructions to profile a risk assessment of pest occurrence within a plurality of data processing modules, the plurality of data processing modules including:
an initialization module configured to 1) receive crowd-sourced reports that indicate a pest presence in a reporting field and identify a pest, 2) correlate positional coordinates of the reporting field and coordinates of one or more targeted fields from at least one GPS-tagged report in the crowd-sourced information from which a GPS receiver extracts the positional coordinates of the reporting field, and 3) identify and obtain additional input data relative to the pest presence, including one or more of pest data that at least includes biological characteristics of the pest, weather information that at least includes one or more of recent and current field-level weather data and short-term weather forecast data for both the reporting field and for the one or more targeted fields, and crop management data that includes at least one of crop planting dates and crop growth information over time for both reporting field and the one or more targeted fields;
one or more modules configured to identify a set of descriptors relating to the pest presence in the reporting field from one or more correlated variable associations of the crowd-sourced observations and the additional input data to develop an expected pest-environment relationship in the reporting field, and construct an adaptive and localized infestation suitability model for the one or more targeted fields from the set of variables to perform a comparison between the reporting field and the one or more targeted fields from the expected pest-environment relationship, in an unsupervised learning model that 1) selects one or more environmental and crop management predictors from the set of descriptors based on a multivariate similarity among the correlated variable associations of the input data, 2) calculates statistical probabilities of similarity of pest occurrence relative to the one or more environmental and crop management predictors, and 3) continually updating the set of descriptors for the pest-environment relationship, the selection of the one or more of the environmental and crop management predictors based on the multivariate similarity among the correlated variable associations of the input data, and the statistical probabilities of similarity of pest occurrence as the crowd-sourced reports are received, and create a risk assessment profile for pest occurrence for the one or more targeted fields; and a pest occurrence prediction module configured to predict a pest occurrence from the risk assessment profile.

12. The system of claim 11, wherein the risk assessment profile is applied to an agricultural support tool to generate one or more advisories for the targeted field.

13. The system of claim 12, wherein the one or more advisories include at least one of an agricultural advisory, a disease advisory, and a regulatory advisory.

14. The system of claim 11, wherein the pest occurrence prediction is generated for a specified period of time in a current growing season.

15. The system of claim 11, wherein the specified time period is determined by the biological characteristics of the pest.

16. The system of claim 11, wherein the pest is an arthropod, a nematode, a pathogen, or a weed.

17. The system of claim 11, wherein the additional input data further includes soil data for the reporting field and the one or more targeted fields, the soil data including one or more of a soil type, a pattern of soil temperature, and a pattern of soil moisture content, for at least one of a current growing season and a period of time extending up to and including a current growing season.

18. The system of claim 17, wherein the crop management data further includes plant canopy conditions over time, crop type information, relative crop maturity, planting date irrigation application data, and tillage information.

19. The system of claim 11, wherein the risk assessment profile is updated for the one or more targeted fields as additional crowd-sourced information for additional reporting fields in a vicinity of a targeted field is received for constructing the adaptive and localized infestation suitability model.

20. The method of claim 11, wherein the biological characteristics of the pest at least include life cycle and development rate of the pest.

21. A method of assessing a field-specific risk of pest occurrence in a targeted field, comprising:

identifying 1) a pest presence in a reporting field, and 2) and positional coordinates of the reporting field, from crowd-sourced information that includes at least one GPS-tagged report from which a GPS receiver extracts the positional coordinates of the reporting field for correlation of the positional coordinates of the reporting field with coordinates of one or more targeted fields;

defining an expected pest-environment relationship for the reporting field by identifying a set of descriptors relating to the pest presence in the reporting field from one or more correlated variable associations of the crowd-sourced information, and one or more of pest data that at least includes biological characteristics of a pest identified in the reporting field, weather information that at least includes one or more of recent and current field-level weather data and short-term weather forecast data for the reporting field, and crop management data that includes at least one of crop planting dates and crop growth information over time for the reporting field;

matching the expected pest-environment relationship for the reporting field at least with weather information that at least includes one or more of recent and current field-level weather data and short-term weather forecast data for the one or more targeted fields, and crop management data that at least one of crop planting dates and crop growth information over time for the one or more targeted fields, by constructing an adaptive and localized infestation suitability model for the one or more targeted fields for performing a comparison between the reporting field and the one or more targeted fields within an unsupervised learning engine, configured to 1) select one or more environmental and crop management predictors from the set of descriptors based on a multivariate similarity among the correlated variable associations, 2) calculate statistical probabilities of similarity of a pest occurrence relative to the selected one or more environmental and crop management predictors, and 3) continually updating the set of descriptors for the pest-environment relationship, selection of the one or more environmental and crop management predictors, and the statistical probabilities of similarity of a pest occurrence, as either of a pest presence in a reporting field or positional coordinates of the reporting field are identified from crowd-sourced information to profile a risk assessment of pest occurrence in the one or more targeted fields; and estimating a probability of pest occurrence for the one or more targeted fields from the profile of risk assessment.

22. The method of claim 21, wherein the probability of pest occurrence is estimated for a specified period of time in a current growing season.

23. The method of claim 22, wherein the specified time period is determined by the biological characteristics of the pest.

24. The method of claim 21, wherein the pest is an arthropod, a nematode, a pathogen, or a weed.

25. The method of claim 21, further comprising identifying and obtaining additional input data that includes soil data for the reporting field and the one or more targeted fields, the soil data including one or more of a soil type, a pattern of soil temperature, and a pattern of soil moisture content, for at least one of a current growing season and a period of time extending up to and including a current growing season.

26. The method of claim 21, wherein the crop management data further includes plant canopy conditions over time, crop type information, relative crop maturity, planting date, irrigation application data, and tillage information.

27. The method of claim 21, further comprising applying the profile to a decision support tool configured to provide one or more advisories of the risk assessment to a user.

28. The method of claim 21, wherein the one or more advisories include at least one of an agricultural advisory, a disease advisory, and a regulatory advisory.

29. The method of claim 21, further comprising updating the probability in the one or more targeted fields as additional crowd-sourced information for additional reporting fields in a vicinity of a targeted field is received for constructing the adaptive and localized infestation suitability model.

30. The method of claim 21, wherein the biological characteristics of the pest at least include life cycle and development rate of the pest.

\* \* \* \* \*